United States Patent
Stokkeland

(10) Patent No.: US 6,968,877 B1
(45) Date of Patent: Nov. 29, 2005

(54) REMOTE CONTROL POWER CHAIN SAW APPARATUS

(76) Inventor: Curtis Stokkeland, 11271 11th St. NE., Cooperstown, ND (US) 58425

(*) Notice: Subject to any disclaimer, the term of this patent is extended or adjusted under 35 U.S.C. 154(b) by 793 days.

(21) Appl. No.: 09/823,111

(22) Filed: Mar. 30, 2001

(51) Int. Cl.$^7$ ............................................. A01G 23/08
(52) U.S. Cl. ..................................... 144/4.1; 144/34.1
(58) Field of Search ............................... 144/4.1, 34.1, 144/24.12, 34.6, 379, 24.13, 343, 208.1, 144/208.3; 83/661, 663, 830, 831, 928; 30/379, 30/379.5; 56/229, 244, 320.1

(56) References Cited

U.S. PATENT DOCUMENTS

| | | | |
|---|---|---|---|
| 3,604,479 A * | 9/1971 | Jordan | 144/34.1 |
| 4,683,924 A * | 8/1987 | Cornelius | 144/4.1 |
| 4,802,327 A * | 2/1989 | Roberts | 56/15.2 |
| 5,201,350 A * | 4/1993 | Milbourn | 144/24.13 |
| 6,085,505 A * | 7/2000 | Edwards | 56/15.2 |
| 6,148,547 A * | 11/2000 | Seigneur et al. | 37/302 |
| 6,662,835 B1 * | 12/2003 | Gengler | 144/34.1 |

* cited by examiner

Primary Examiner—Derris H. Banks
Assistant Examiner—Shelley Self
(74) Attorney, Agent, or Firm—Robert E. Kleve

(57) ABSTRACT

The invention comprises a remote controlled power chain saw which can be remotely operated and remotely positioned to different heights and at different angles. The chain saw has a front and rear assembly with an endless chain with cutting teeth thereon which is pivotally mounted on a main frame of the front assembly and powered by a hydraulic cylinder to pivot downward about an axis out of the bottom of the assembly for using the chain to cut with power means to power the endless chain. The front assembly is pivotally mounted to the rear assembly about an axis perpendicular to the first mentioned axis and is power operated to pivot thereby pivot the chain to two different angles. The rear assembly is mounted to the forward end of a plurality of telescoping booms which booms are pivotally mounted to a vehicle so that the saw can be transported to a site for cutting and the saw telescoped and pivoted by the booms to different heights and angles and further pivoted to two different angles by the pivotal connection of the front and rear assembly and the pivotal connection of the saw to the front assembly.

3 Claims, 3 Drawing Sheets

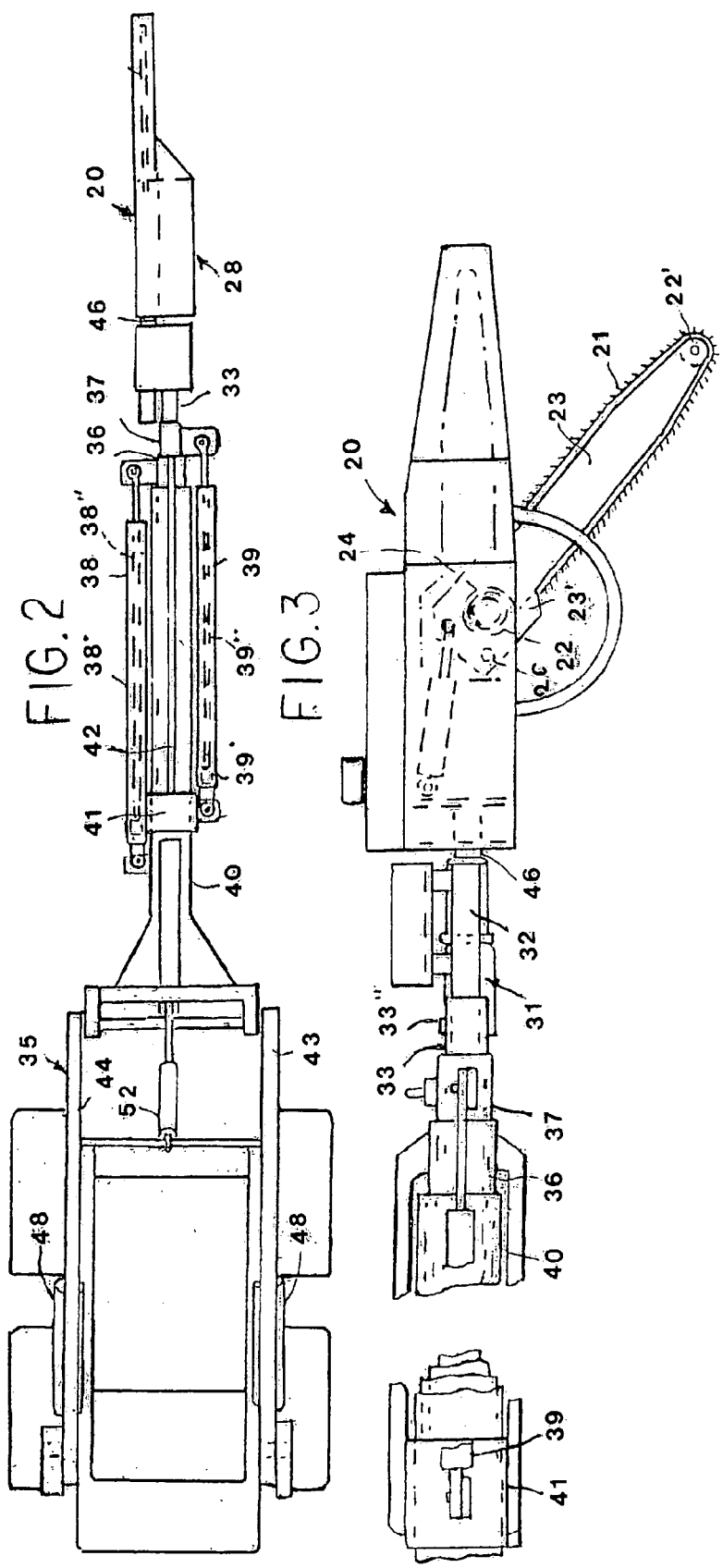

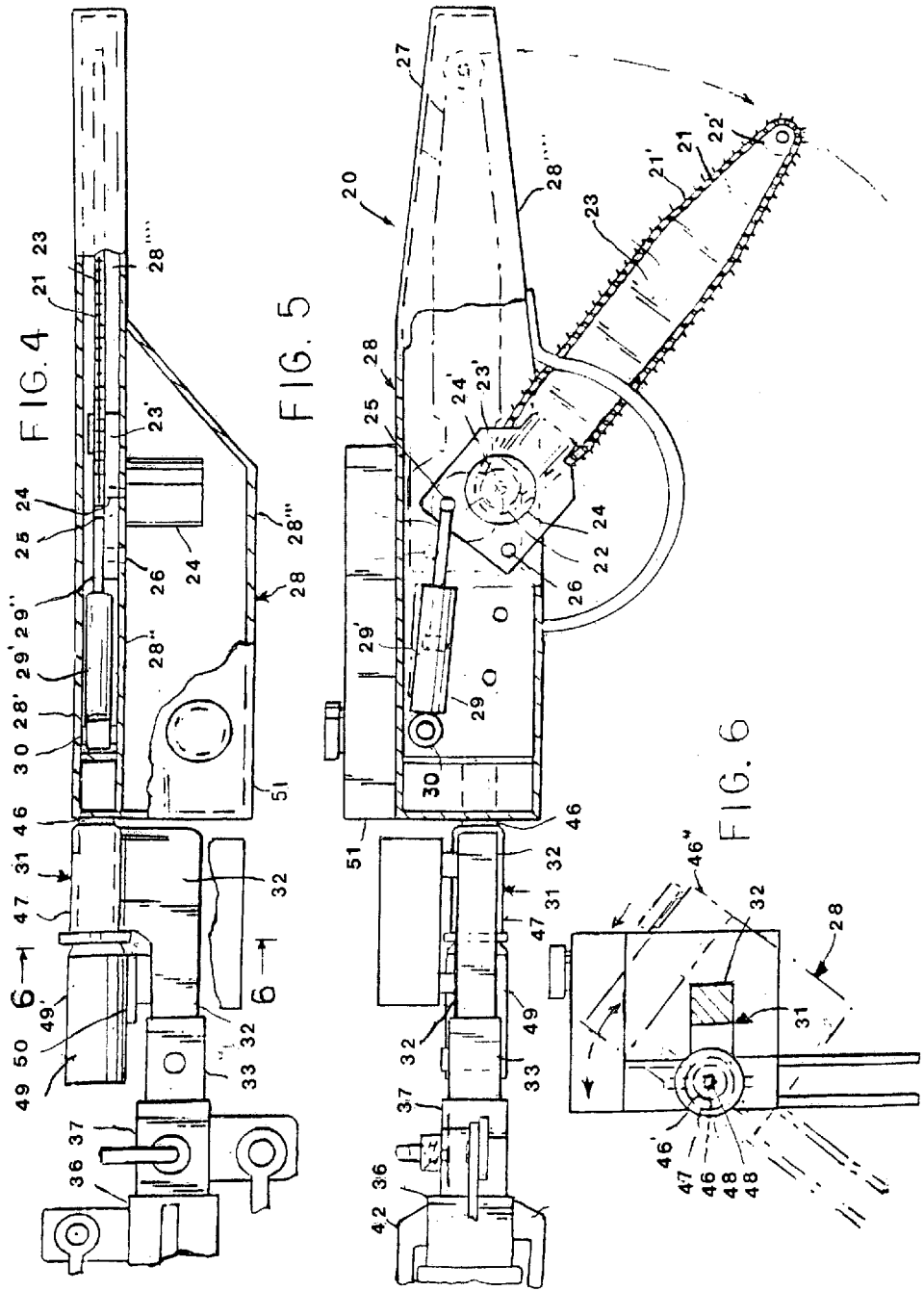

REMOTE CONTROL POWER CHAIN SAW APPARATUS

This invention relates to remote controlled power chain saw, more particularly, the invention relates to remotely positioning a power chain saw at selected various angles and heights.

It is an object of the invention to provide a novel remote controlled power chain saw with a power positioning mechanism to enable the chain saw to be positioned at a selected angle and height and operated for cutting objects with the saw at the selected position.

It is another object of the invention to provide a remotely controlled chain saw having a positioning mechanism to pivot the saw about at least two axes perpendicular to one another.

It is a further object of the invention to provide a novel remote controlled power chain saw which can be remotely positioned longitudinally and pivoted axially about the longitudinal path as well pivoted about two additional axes at different perpendicular angles to the longitudinal path.

It is another object of the invention to provide a novel remotely controlled power saw which can be remotely positioned about various different axes and along different locations along a path.

It is another object of the invention to provide a mobile remotely controlled chain saw on telescoping boom of a vehicle for remotely positioning the chain saw on a telescoping boom of the vehicle and for operating the chain saw when positioned on the boom.

Further objects and advantages of the invention will become apparent as the description proceeds and when taken in conjunction with the accompanying drawings wherein:

BRIEF DESCRIPTION OF THE DRAWINGS

FIG. 2 is a top plan view of the remotely controlled chain saw on a telescoping boom of a vehicle.

FIG. 3 is an enlarged side elevational view of the remote controlled chain saw.

FIG. 4 is an enlarged top plan view of the remotely controlled chain saw.

FIG. 5 is a view taken along line 5—5 of FIG. 3.

FIG. 6 is a cross sectional view taken along line 6—6 of FIG. 3.

Figure 1:
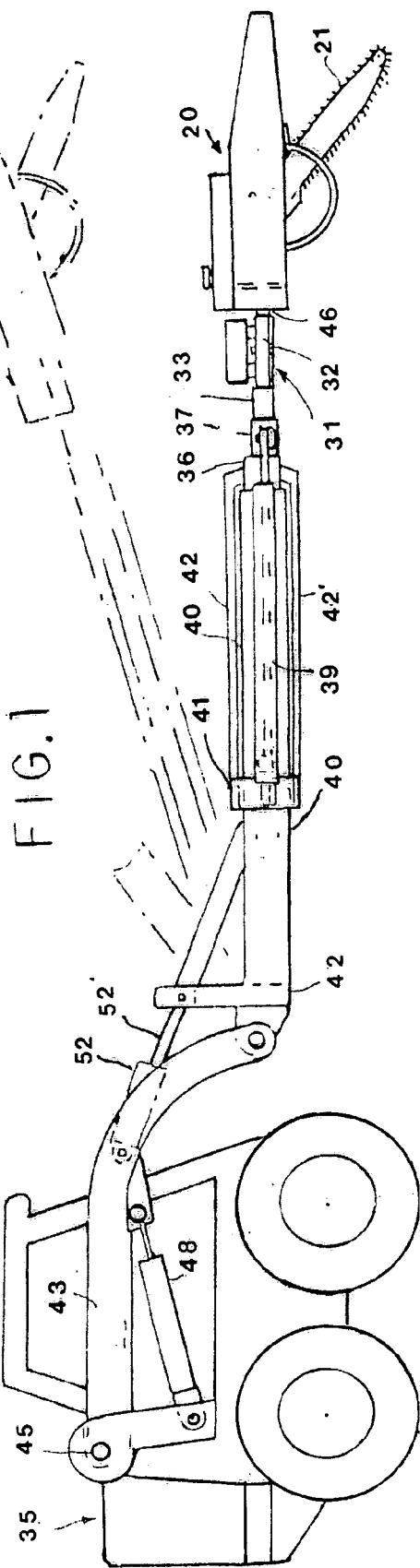
FIG. 1 is a side elevational view of the remotely controlled chain saw mounted on a telescoping boom of a power vehicle.

Briefly stated, the invention comprises a remote controlled power chain saw having a main saw frame, and a rear saw frame. An endless chain and cutting teeth on the endless chain is pivotally mounted to the main saw frame to pivot about one axis, to pivot the endless chain out of its housing for operative use. The endless chain and its cutting teeth and main saw frame are also pivotally mounted about a second axis, perpendicular to the first axis, relative to the rear saw frame, to pivot the endless chain at an angle relative to the rear saw frame. The rear saw frame is detachable mounted to the forward telescoping sleeve of a telescoping boom, and the telescoping boom at its rear end is pivotally mounted to the forward end of a mobile vehicle, whereby the telescoping sleeves of the telescoping boom may telescope the power chain saw longitudinally forward relative to the mobile vehicle and the pivotal mounting of the rear end of the boom may pivot the telescoping boom and endless chain and cutting teeth upward about axis of the rear end of the telescoping boom to the mobile vehicle.

BRIEF DESCRIPTION OF PREFERRED EMBODIMENT

Referring more particularly to the drawings, in FIGS. 1 and 2, the remote controlled power chain saw invention 20 is illustrated. The saw invention 20 has a front housing 28 and a rear end assembly 31.

In the front housing 28 is a conventional endless chain 21 with cutting teeth 21 ' mounted on the chain. A pair of gears 22 and 22' rotatably support the endless chain 21. Gear 22' is rotatably mounted on the outer end of the center place 23. A hydraulic motor 24 is mounted on the main plate 23' and its output shaft 24' rotated relative to the plate 23' with the outer end of the shaft having the gear 22' fixed coaxially to the shaft 24' and the motor and its shaft rotatably drives the gear 22' and thereby drives the gears 22 and 22' and thereby drives the chain 21 about the gears to operate the chain saw.

The front housing 28 has three upright walls 28', 28'', and 28''' with an open bottom 28'''' between walls 28' and 28'' for the chain 21 to pivot down and out of the housing 28 for use. The mounting plate 23' is pivotally mounted to the middle wall 28'' of the front housing 28 by a pin 26 and serves as a mounting plate for mounting the chain saw thereto. The pivoting of the mounting plate 23' on its pin 26, relative to the housing also pivots, relative to the housing, the chain 21 upward and downward about the pin 26, as well as the center plate 23, the gears 22 and 22' and motor 24. The clockwise pivoting of the mounting plate 23' will to pivot the chain 21, the center plate 23 and gear 22' downward out of the housing through the open bottom 28''' about the axis of pin 26 from its storage position as shown in phantom lines 27, to its position shown in solid lines in FIG. 1 when the chain saw is being operated or used, and the mounting plate 23' pivots them back upward about its axis pin 26 back to its storage position as shown in phantom lines 27.

A hydraulic piston and cylinder 29 powers the pivoting movement of the mounting plate 23 about pin 26'. The hydraulic piston and cylinder 29 is mounted in the housing 28 with the cylinder 29' pivotally mounted to the housing wall 28' at pivot point 30, and with the piston 29'' pivotally mounted to the mounting plate 23' at pivot point 25. Consequently, the telescoping of the piston 29'' hydraulically pivots the mounting plate 23' and the mounting plate pivots the center plate 23 the gears and endless chain clockwise about the pin 26 downward out of the housing to their operative position as shown in solid lines in FIG. 1. The hydraulic retracting of the piston back into the cylinder, pivots the center plate, gears and cutting chain counterclockwise up about pin 26 into the housing 28 to their position shown in phantom lines for storage.

The rear end assembly 31 of the chain saw apparatus 20 has an L shape arm 32' with it rear leg 32' rectangular in shape. The rear leg 32' is slidably inserted and detachably mounted to the forward end of sleeve 33 by a pin 33'' of a telescoping boom assembly 34 of a mobile vehicle 35, so that the chain saw apparatus 20 may be operated by the mobile vehicle 35.

The telescoping boom assembly 34 has three telescoping booms or sleeves 33, 36 and 37. The sleeves 36 and 37 are powered in their telescoping action, powered hydraulically by piston and cylinders 38 and 39 which telescope the booms 36 and 37 respectively in and out, with boom 36 telescoping in and out of sleeve 40.

The boom 40 is stationary, relative to the sleeves 36, 37, 33, and saw apparatus 20. A a ring 41 is slidable along the length of the elongated sleeve or boom 40 between the cylinders 38' and 39'. An upper and lower rib 42 and 42' are fixed at their rearward one ends to the ring 41 with the forward ends of the ribs fixed to the forward end of the sleeve 36. The ring and ribs are fixed together and to the sleeve 36 move with the forward end of the sleeve 36 and act to guide the telescoping movement of the sleeve 36 in and out of the sleeve 40 either forward or rearward relative to the sleeve or boom 40.

The hydraulic cylinder 38 has its cylinder member 38', at its rearward end 28''' pivotally mounted to the stationary sleeve 40. The piston 38" of the piston and cylinder 38 is pivotally mounted to the forward end of the sleeve 36 so that powering the piston 38" telescopes the sleeve 36 forward and back to their position shown in solid lines in FIG. 1, relative to sleeve 40. The ring 41 and ribs 42 and 42', being fixed between the ring and the sleeve 36, slide with the sleeves 36 along the outside of the sleeve 40 with the sleeve 36 moving back and forth.

The rear end of cylinder portion 39' of second piston and cylinder 39 is pivotally mounted to the sliding ring 41. Consequently, the powering of the ring 41 forward and rearward by the piston 38" thereby also powers or slides the second piston and cylinder 39 forward and rearward. The forward end of piston 39" is pivotally mounted to sleeve 37 so that the sleeve 37 also slides forward and back with sleeve 36 when the second piston and cylinder 39 when it slides forward and back.

Although the entire piston and cylinder 39 slides forward and rearward with the ring and sleeve 36, the actuation of piston and cylinder 39 telescopes piston 39" further forward and back which slides the sleeve 37 further forward and back, relative to sleeves 40 and 36. The sleeve 33 is manually inserted into sleeve 37 and is held in place by pin 33'. The sleeve 33 has series of spaced holes to selectively receive the pin 33', so that the sleeve 33 can be telescoped outward relative to sleeve 37 a selected distance, and the sleeve 33 being pinned to sleeve 37 moves forward and rearward with sleeve 37.

The boom or sleeve 40 is pivotally mounted to arms 43 and 44 at the forward end of the mobile vehicle 35.

The L shaped arm 32 of the rear assembly 31 has a sleeve 47 fixed to it lateral front leg 32". A shaft 46 is rotatably mounted in the sleeve 47 of the L shaped arm 32. The shaft 46 is fixed between the walls 28" and 38''' of the front assembly and supports the entire front housing assembly 28, including the cutting chain 21 and teeth 21', as well as the mounting plate 23, gears 22 and 22', motor 24, and hydraulic piston and cylinder as well as the other components of the front assembly, is mounted to the shaft 46.

Consequently, since the forward end of the shaft 46 is fixed to the front assembly 28, pivoting or rotating the shaft 46 in the sleeve 47 of the L shaped arm 32, pivots or rotates the entire front housing assembly 28, including the housing walls, mounting plate 23 and plate 23', chain 21, motor 24, piston and cylinder 29 with the shaft 46 in the sleeve of the L shaped arm about the axis 46' of the shaft 46, so that the rotation of the shaft 46 in the sleeve 47 rotates the entire front housing assembly including the aforementioned components, relative to the rear assembly 31.

The axis of rotation 46' of the front assembly 28 is perpendicular to the axis of pin 26. The rotation about the axis 46' acts to pivot the entire front assembly including the chain 21 at different angles, such as shown in phantom lines 46" in FIG. 6; while axis of rotation about pin 26 pivots the cutting chain 21 and teeth in and out of the housing of the front assembly about the second axis.

The shaft 46 of the rear assembly 31 has a rear flange 48 and a small gear 48' fixed axially to the shaft and a projects rearward. A conventional motor 49 has a center recess with conventional planetary gears surrounding the center recess to receive the small gear axially therein and mesh with the planetary gears of the motor, so that operating the motor 49 rotates the planetary gears which rotates the small gear 48 which rotates the shaft 46' about its center axis 46 which rotates the entire front assembly 28 about the center axis 46' relative to the rear assembly 31. The housing 49' of the motor 49 is fixed to the plate 50 of the L shaped arm 32 of the rear assembly.

A fluid reservoir 51 is fixedly mounted to the top of the front assembly 28 of the chain saw and also rotates with the front assembly about the shaft 46'. The fluid reservoir provides lubricating oil for the chain 21. The hydraulic fluid for operating the hydraulic motors 24, piston and cylinder 29, and motor 49 comes from the mobile vehicle 35.

In order to lengthen the chain saw assembly 20 further on the booms to further different lengths, the fourth boom 33, to which the L shaped arm of the rear assembly of the chain saw assembly 20 is inserted can be adjusted manually by being telescoped in and out of sleeve 37 by raising and removing the spring loaded pin 37' to remove the pin from one of a series of bores in sleeve 37 along its length, which lock the boom 33 to sleeve 37 and sliding the boom 33 further out and releasing the pin with the spring reinserting the pin in a bore in sleeve 37 further along the length of sleeve 37.

The rear end of sleeve 40 of the sleeve or boom assembly is fixed to the lateral frame 42. The lateral frame 42 is pivotally mounted to the pair of arms 43 and 44 of the mobile vehicle 35. The mobile vehicle 35 has a pair of arms 43 and 44 which are pivotally mounted at their other ends to the mobile vehicle 45 at pivot points 45'. Hydraulic pistons and cylinders 48 on each side of the vehicle are pivotally connected between the arms and the vehicle so that telescoping actuation of the piston and cylinder 46 pivots the arms upward relative to the mobile vehicle, thereby pivoting and raising the telescoping boom and power chain saw 20 upward about the axis of the arms in their connection to the vehicle. The hydraulic pistons and cylinders 48 are pivotally connected between the arms of the vehicle and the sleeve 40 of the telescoping boom so that actuation of the pistons and cylinder 48 acts to telescope their pistons 48' which pivots telescoping boom and power chain saw upward and downward about the axis of the arms pivotal connection to the rear end of the telescoping boom.

Operation:

The remote controlled chain saw apparatus 20 can be operated by controls in the mobile vehicle and can be moved to various positions for cutting objects, such as tree branches, by moving the chain saw apparatus forward and upward by the telescoping booms; and/or pivoting the chain saw to an angle relative to the boom by operating hydraulically the piston and cylinder 29 and the hydraulic motor 49, respectively, from the cab of the mobile vehicle and then, pivoting the chain saw apparatus upward or downward at the forward end of the boom about the pivotal connection 51 of the stationary boom 40 to the frame.

The cylinder 52" of the piston and cylinder 52 is pivotally mounted between the forward portions of the arms 43 and 44 and the piston 52' is pivotally mounted to a frame 53 at pivot point 54. The frame 53 is fixed to rear end of the boom 40, so that hydraulically actuating the piston and cylinder 52 to telescope the piston 52' pivots, about pivot the boom 40, as well as the entire boom assembly and the front and rear assemblies as well as the saw 20 about the pivotal connection 54' of the frame 42 to the arms 43 and 44.

If for example, the remote controlled saw invention 20 is being used to cut branches off of trees, the saw 20 will be elevated by telescoping the pistons 48' of the pistons and cylinders on each side the vehicle 35 to pivot the arm 43 and 44 of the vehicle 35 upward about their pivot connection 45' to the vehicle to place the saw at an upward angle, pointing the tip of the saw toward the branch to be cut. The piston 52' may also be activated to hydraulically telescope to pivot the boom assembly and front and rear saw assembly about the pivotal connection 54 at the forward ends of the arms of the vehicle to pivot the saw at a move vertical angle if desired.

Depending upon the height of the branch, the pistons 38' and 39' may be telescoped hydraulically to telescope the saw invention up to further in height when necessary. The saw will initially be operated with the saw blade 21 pivoted upward into the housing 28' as shown in phantom lines 55.

When the saw has been telescoped upward sufficient to reach the branch of the tree to be cut, the operator will initially place the tip of the housing 28' above the branch to be cut, and pivot the saw forward about its pivotal connection of the booms to the vehicle until the bottom edge 56 of the saw housing rests at its upward angle against the branch to be cut with the saw blade remaining in the housing Thereupon, the operator will activate the hydraulic motor 24 to cause the chain 21 to rotate the piston 29' out of the cylinder 29", with the chain rotating the cutting blade 21 on the saw. The activation and telescoping of the piston 29 causes the saw blade to pivot gradually out of its housing about the pin 26, so that as the blade is pivoted outward from the housing, it will pivot against the branch and the rotating teeth 21' on the rotating chain will cut forward and downward into the branch to be cut and continue cutting forward and downward as the piston continued to telescope thereby continuing to pivot the blade forward and downward, until the teeth of the chain of the power saw cut completely through the branch to be cut.

In necessary, the saw may be pivoted at an angle to reach to proper cutting position by activating the motor 49, to pivot the front saw assembly 28 including the cutting blade 23 about the shaft 46, relative to the rear assembly 31. The saw and front assembly can be pivoted about the shaft 46 from its upright position as shown in solid lines nearly 180 degrees in either direction, for a total of nearly 360 degrees of angle selectivity.

Thus, the position of the cutting chain 21 of the chain saw 20 will change during the cutting of the branch, by the saw pivoting out from the housing about pin 26 by actuation of the hydraulic piston and cylinder 29. Also, the position of the cutting chain can be changed by being pivoted about the axis 46' by the driving of the motor 49, which causes the gears tor rotate the front assembly 28 of the chain saw about the axis 46'. Thus the position of the saw changes about two different axes, perpendicular to one another and is controlled remotely controlling the hydraulic piston and cylinder 29 and the hydraulic motor 49 which can be controlled from the cab of the vehicle by an electrical connection to the hydraulic and electrical controls for the motor and cylinder. The entire saw operation can be controlled electronically from the cab of the vehicle.

The lengths of the telescoping sleeves or booms 36 and 37 as well as sleeve 33 will be approximately the length of the boom 38 or approximately 7 feet each with their rear ends 36', 37', 33', and 38' adjacent one another as illustrated in FIG. 3 so as to enable the sleeves or booms to telescope the power saw from approximately 8½ feet to approximately 20 feet. When the sleeves are extended relative to one another, they will extend the remote chain saw invention 20 approximately 20 feet from the vehicle for extending the saw invention upward and or forward of the mobile vehicle to which the saw invention is mounted to reach the object being cut by the saw.

Thus, it will be seen that a novel remote controlled power chain saw has been provided which can be controlled from the cab of the vehicle by pivoting the chain saw upward to point the saw at the object to be cut by pivoting the booms upward about their pivotal connection to the arms of the vehicle and activating the telescoping boom apparatus to extend the chain saw upward to the object.

It will be obvious that various changes and departures may be made to the invention without departing from the spirit and scope thereof, and accordingly, it is not intended that the invention be limited to that specifically described in the specification, or as illustrated in the drawings but only as set forth in the appended claims wherein:

What is claimed is:

1. A mobile cutting apparatus comprising a mobile vehicle having pivotally mounted forward elongated boom at its forward end;

a remote controlled power chain saw mounted at the forward outer end of the boom, hydraulic piston and cylinder means to raise and lower the boom about its pivotal mounting to the vehicle, said boom having telescoping means for telescoping forward along its length to extend the chain saw forward relative to the mobile vehicle, said saw being rotatably mounted to the outer end of the boom to rotate coaxially of the length of the boom, hydraulic power means for powering said coaxial rotation of the saw;

said saw being elongated in a forward direction and being pivotally mounted at its rearward end to the forward end of the boom to raise and lower the forward end of the saw about said pivot for operating the saw, said saw comprising an endless chain with cutting teeth on the chain, whereby the saw may be manipulated to different positions by varying the position and length of the boom and by rotating the saw coaxially and raised and lowered about its rearward pivot to place the saw in different positions for cutting various objects, housing means for housing said saw when not in use, hydraulic means for powering the chain saw out of the housing for use in sawing.

2. A mobile cutting apparatus comprising a mobile vehicle having pivotally mounted forward elongated boom at its forward end;

a remote controlled power chain saw mounted at the forward outer end of the boom, hydraulic piston and cylinder means to raise and lower the boom about its pivotal mounting to the vehicle, said boom having hydraulically actuated telescoping means for telescoping forward along its length to extend the chain saw forward relative to the mobile vehicle to thereby telescope said saw at the forward end of the boom in a forward direction, said saw being rotatably mounted to the outer end of the boom to rotate coaxially of the length of the boom, hydraulic power means for powering said coaxial rotation of the saw;

means for housing and enclosing said saw about its sides and top, said saw being forward elongated and pivotally mounted at its rearward end to pivot the forward end of the saw upward and downward, hydraulic means for powering the pivoting of the forward end of the saw, said saw being pivotal downward to lower the saw below the housing for operating the saw, said saw comprising an endless chain with cutting teeth on the chain, whereby the saw when lowered from the housing and thereafter manipulated to different positions by varying the position and length of the boom and by rotating the saw coaxially about the length of the boom to place the saw in different positions for cutting various objects;

remote control means on said mobile vehicle remotely connected to said hydraulic means for pivoting and telescoping the boom, for coaxially rotating the saw, and for lowering the saw and activating the rotation of the chain saw chain.

3. A mobile cutting apparatus comprising a mobile vehicle having pivotally mounted forward elongated boom at its forward end;

a remote controlled power chain saw mounted at the forward outer end of the boom, hydraulic piston and cylinder means to raise and lower the boom about its pivotal mounting to the vehicle, said boom being extendable in a forward direction to thereby extend the chain saw forward relative to the mobile vehicle, hydraulic means for powering said boom extension, said saw being rotatably mounted to the outer end of the boom to rotate coaxially about the length of the boom, hydraulic power means for powering said coaxial rotation of the saw;

means for housing and enclosing said saw about its sides and top, hydraulic means for powering to pivotally lower the saw below the housing for operating the saw, said saw comprising an endless chain with cutting teeth on the chain, whereby the saw when lowered from the housing may be manipulated to different positions by varying the position and length of the boom and by rotating the saw laterally about the boom to place the saw in different positions for cutting various objects;

remote control means on said mobile vehicle remotely connected to said hydraulic means for pivoting and extending the boom, coaxially rotating the saw, and lowering the saw and activating the rotation of the chain saw chain.

* * * * *